PROTECTIVE CIRCUIT FOR ELECTRO-FIRING DEVICES

Filed Aug. 13, 1963

INVENTOR
CARL I. PETERS, JR.
BY
P. H. Firsht
ATTORNEY.

United States Patent Office 3,343,491

Patented Sept. 26, 1967

3,343,491

PROTECTIVE CIRCUIT FOR ELECTRO-FIRING DEVICES

Carl I. Peters, Jr., 307-A Fowler Ave., China Lake, Calif. 93555

Filed Aug. 13, 1963, Ser. No. 301,922
1 Claim. (Cl. 102—70.2)

The invention described herein may be manufactured and used by or for the Government of the United States of America for governmental purposes without the payment of any royalties thereon or therefor.

The present invention relates to electrically-fired squibs, primers, detonators and the like, and more particularly to a system for protecting such electro-firing devices against premature and spurious ignition by electromagnetic energy.

While electro-firing devices are employed not only in missiles but in other ordnance and in civil applications as well, and the invention is thus of general utility, it will be described exemplarily with particular reference to missile applications.

Squibs, primers, detonators and like devices of electro-firing type here under consideration may take a large variety of forms, but are otherwise characterized by a resistive element, usually a fine-gauge wire, bridging a pair of lead wires or posts and coated with (or otherwise embedded in, or in proximity to) a suitable chemical composition which either deflagrates or explodes (depending upon the particular application and design) when the bridge wire is flashed or brought to high temperature by a current of sufficient RMS (root-mean-square) magnitude and duration. These electro-firing devices are further characterized by comparatively small resistance (say of the order of one ohm) and requiring, for firing or flashing, only a fractional ampere DC (direct current) of short duration, and thus comparatively little energy; for overall economy of energy source equipment in missiles in particular, the source is generally a comparatively small battery, and a compact high-farad capacitor in which an electrical charge is stored during an early portion of missile flight.

It is of course intended that ignition of the electro-firing device shall be solely under control of switch means in the firing circuit connecting the device to the voltage and current source; the switch means, in the case of missile applications, may itself be controlled in any manner, for example by a timer, or a proximity fuze, or responsive to a sensed condition or an input signal. It has been found, however, that the sensitive electro-firing devices are hazardously and otherwise undesirably susceptible to spurious ignition in other manner, for example by transfer of energy from RF (radio-frequency) fields, arising from radio and radar apparatus, to which missiles for example are inevitably exposed on occasion. Such spurious ignition can take place because the bridge wire can be heated or flashed by any current, regardless of waveform or frequency, provided it is of sufficient RMS magnitude and duration; and because electro-firing device circuits are not normally immune to induced voltages and currents. Again taking a missile environment by way of example, ignition energy is easily coupled from an RF field to the electro-firing device, say via the wiring harness connecting the device to its firing circuit elements, or because the missile itself may be strongly excited by RF energy, or even because of antenna or waveguide effects of missile structure gaps or slots. Premature ignition of electro-firing devices in missiles has consequently been experienced for example on aircraft carriers and other ships to which missiles are transferred and stored, also in missiles mounted in launchers, or carried by aircraft, and during missile flight, as a result of RF fields arising from nearby radio and radar transmitters. Spurious ignition can also arise in other manner, for example as a result of so-called switching spikes in other electrical circuits, coupled to the electro-firing device circuit through say intercabling capacitance.

It is the primary object of the present invention to provide an electro-firing device circuit improvement which substantially eliminates premature and hazardous ignition by RF fields and other spurious firing sources.

It is a further object of the invention to provide missiles with an electro-firing device ignition circuit improvement yielding substantial immunity to spurious ignition of the electro-firing device and which thus simplifies handling procedures and relieves handling requirements.

These and other objects and advantages of this invention will be readily appreciated as the same becomes better understood by reference to the following description when considered in connection with the accompanying drawing wherein.

In accordance with the present invention, there is employed in novel combination, with the electro-firing device, a low-pass RF trap which is also of novel circuitry per se, the RF trap operating with improved effectiveness to suppress spurious ignition currents in the electro-firing devices, yet with remarkable economy of equipment and thus with minimum cost and volume requirements.

Figure 1:
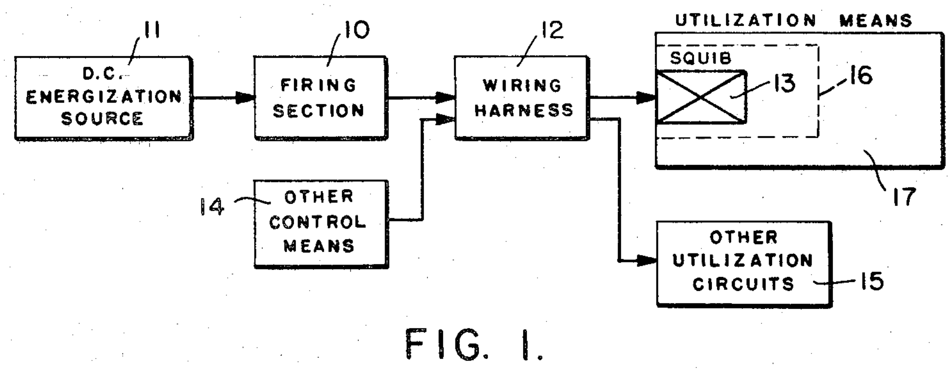
FIG. 1 depicts generally and schematically the major elements of an illustrative electro-firing device circuit as employed in a missile.

Referring first to the FIG. 1 block diagram for an understanding of a general type of circuit environment in which electro-firing devices may be employed in missiles, the circuit includes a control or firing section 10, responsive to some preselected condition, for application of voltage and current from DC energization source 11 through wiring harness 12 to an electro-firing device, say a squib 13. Wiring harness 12 generally includes circuit leads extending from other control circuits 14 to other utilization means 15. Squib 13 is in practice mounted in a housing 16 of any type suitable to enable squib-actuated utilization means 17 to be exposed to the squib's firing, pressure-producing or low-order explosive action, as the case may be. In the absence of some form of protective "fix," squib 13 would be subject to premature and spurious ignition as has been indicated.

Figure 2:
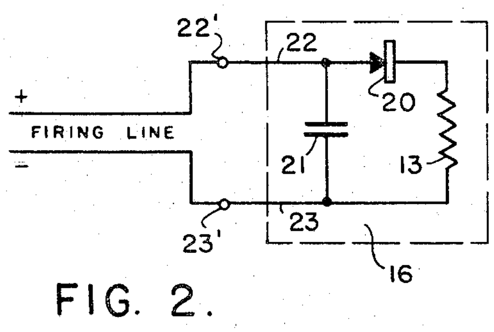
FIG. 2 illustrates the basic elements and circuitry of the electro-firing device ignition circuit improvement in accordance with the present invention.

FIG. 2 illustrates the basic and simple yet remarkably effective circuit, in accordance with the invention, of the improved combination for protecting electro-firing devices against ignition by switching spikes, electromagnetic radiation fields and other such spurious and hazardous sources. The RF trap comprises a semiconductor diode 20 in series with the electro-firing device 13, and a capacitor 21 shunted across the firing line, the capacitor and diode being placed closely adjacent to the electro-firing device 13, and the diode being properly poled to conduct DC ignition current in the normal direction in the particular firing line lead in which the diode is inserted. The RF trap is preferably mounted with short connections to electro-firing device 13, all within the housing 16, provided with two leads 22, 23 to which the internal elements are connected, and two terminals 22', 23' for connection to the firing line. Expressed in qualitative terms, the shunt capacitor 21 bypasses the major portion of the spurious firing current and reduces the input voltage to a low value; with respect to the RF voltages normally encountered, the diode functions not only to insert resistance in the electro-firing device branch circuit across the firing line, but to further decrease RF current flow in that branch circuit by virtue of its rectifying action and to still further decrease RF current by building up on the shunt capacitor a bias potential which opposes the spurious source voltage, all without attenuating appreciably the DC energy when applied at normal firing time. Because of square law detection action, the forward resistance presented by the diode is negligible (say of the order of 1 ohm) at the DC firing potentials normally employed, while presenting comparatively high forward resistance to the very low RF potentials developed across the capacitor. For reasons of securing extreme compactness, and where the input RF current will not be greater than about 4 amperes, capacitor 21 is preferably of tantalum electrolytic type, say of 6.8 microfarad capacity and having a 35-volt rating; for input RF currents of up to about 10 amperes, metallized paper types of say about 1 microfarad capacity and having a 200-volt rating have been found satisfactory. Diode 20 should be selected to provide sufficiently high forward resistance (say of the order of 200 ohms, in terms of so-called equivalent resistance) at the comparatively low RF potentials experienced by shunt capacitor 21, so that it shall be effective as a dissipative element; negligible resistance at DC firing current level; minimum capacitance (not over 10 micro-microfarad); ability to pass high momentary current without burnout; and resistance to adverse environmental conditions. Such diode characteristics appear to be best satisfied by certain germanium diodes, for example the type IN34AS, a glass-sealed type which is particularly well-suited for the RF trap circuit in that it meets all electrical requirements and is also very small and therefore adapted to a miniaturized version of the RF trap. Employing such a diode and capacitor, spurious RF currents through squib 13 can be held to maximum levels no greater than several microamperes, far below the squib ignition level, yet without requiring any modification of the usual DC energization source requirements. To accommodate greater RF currents, one or more capacitors can of course be employed in parallel connection; likewise where greater series resistance to RF currents in the diode branch seems advisable, one or more additional diodes can be inserted in series with squib 13.

Figure 3:
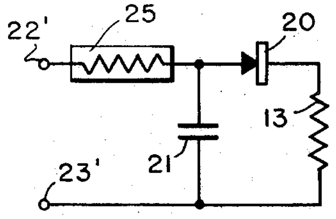
FIG. 3 illustrates a modification of the FIG. 1 circuit to include a series impedance element for use with low-impedance energization sources.
Figure 4:
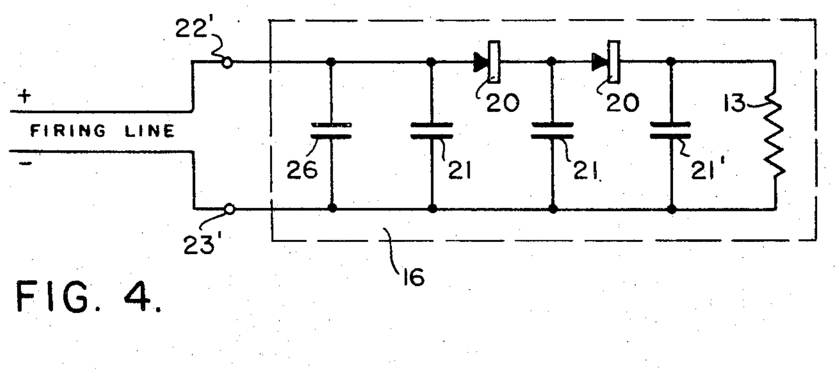
FIG. 4 illustrates another electro-firing device ignition circuit based upon that shown in FIG. 1.

The two-element L-section RF trap illustrated in FIG. 2 can be built into a three-element T-section type by addition of a series input element, as shown in FIG. 3, for applications which (while infrequently encountered) require increased insertion loss or compatibility with low-impedance energization source inputs. The circuit remains the same as that illustrated in FIG. 2 except for addition of a series input element 25. Input element 25 is preferably provided as a resistive impedance which is of comparatively high value to RF voltages, yet of negligible magnitude to DC in order not to interfere with normal firing, and able to withstand input voltages of the order of 100 volts and input currents of the order of 1 ampere, not necessarily concurrently. Such an input element is therefore best provided in the form of an RF dissipative material, available commercially.

Where still more RF attenuation is desired and a somewhat greater number of RF trap elements can be tolerated, the FIG. 2 circuit may of course be cascaded. The FIG. 4 circuit is thus essentially the same as that shown in FIG. 2, each of the filter sections therein functioning basically as has been described for the two-element L-section RF trap, further including an additional RF by-pass capacitor 21′ across squib 13, and an input shunting capacitor 26 (say of the order of 0.0015 microfarad) to insure excellent bypassing action at extremely high radar frequencies.

Obviously other modifications and variations of the present invention are possible in the light of the above teachings. It is therefore to be understood that within the scope of the appended claim the invention may be practiced overwise than as specifically described.

What is claimed is:

In an electrical ignition circuit including an electro-firing device and a wiring harness comprising a firing line for conducting firing voltage and current from a DC energy source to the electro-firing device, an improved spurious ignition hazard suppression means comprising:

a semiconductor diode series-connected between said wiring harness and said electro-firing device;

said diode exhibiting a high resistance to RF energy and a negligible resistance to the DC energy source;

an RF by-pass capacitor connected in shunt relationship across the series-connected semiconductor diode and electro-firing device;

said diode being poled to present negligible resistance to said DC energy source.

References Cited

UNITED STATES PATENTS

| | | | |
|---|---|---|---|
| 2,818,020 | 12/1957 | Burklund | 102—70.2 X |
| 2,926,610 | 3/1960 | Ruchlemann | 102—70.2 |
| 3,225,695 | 12/1965 | Kapp et al. | 102—70.2 |

BENJAMIN A. BORCHELT, *Primary Examiner.*

SAMUEL FEINBERG, *Examiner.*

L. L. HALLACHER, W. C. ROCH. *Assistant Examiners.*